(12) United States Patent
Schwabe et al.

(10) Patent No.: US 11,572,463 B2
(45) Date of Patent: Feb. 7, 2023

(54) THERMOPLASTIC MOLDING COMPOUNDS

(71) Applicant: Clariant International Ltd, Muttenz (CH)

(72) Inventors: Jeremia Schwabe, Augsburg (DE); Erik Hauck, Pirmasens (DE); Simon Bodendorfer, Augsburg (DE); Sebastijan Bach, Charlotte, NC (US); Matthias Roessle, Reutern (DE); Torsten Lindner, Schwalbach am Taunus (DE); Robert Turner, Cincinnati, OH (US); Christian Neu, Schwalbach am Taunus (DE); Matthias Morand, Schwalbach am Taunus (DE); Gabriele Stiehl, Schwalbach am Taunus (DE)

(73) Assignee: Clariant International Ltd, Muttenz (CH)

( * ) Notice: Subject to any disclaimer, the term of this patent is extended or adjusted under 35 U.S.C. 154(b) by 95 days.

(21) Appl. No.: 17/251,336

(22) PCT Filed: Jul. 24, 2019

(86) PCT No.: PCT/EP2019/069925
§ 371 (c)(1),
(2) Date: Dec. 11, 2020

(87) PCT Pub. No.: WO2020/020949
PCT Pub. Date: Jan. 30, 2020

(65) Prior Publication Data
US 2021/0277216 A1    Sep. 9, 2021

(30) Foreign Application Priority Data
Jul. 26, 2018 (DE) .................... 10 2018 118 105.1

(51) Int. Cl.
*C08L 23/16* (2006.01)
*C08L 23/14* (2006.01)
*C09J 123/14* (2006.01)

(52) U.S. Cl.
CPC .............. *C08L 23/14* (2013.01); *C08L 23/16* (2013.01); *C09J 123/14* (2013.01);
(Continued)

(58) Field of Classification Search
None
See application file for complete search history.

(56) References Cited

U.S. PATENT DOCUMENTS

| | | |
|---|---|---|
| 5,026,756 A | 6/1991 | Arendt |
| 5,081,322 A | 1/1992 | Winter et al. |

(Continued)

FOREIGN PATENT DOCUMENTS

| | | |
|---|---|---|
| DE | 112016001247 T5 | 12/2017 |
| EP | 0384264 A1 | 8/1990 |

(Continued)

OTHER PUBLICATIONS

International Search Report (with partial translation) and Written Opinion dated Oct. 31, 2019, issued in corresponding International Patent Application No. PCT/EP2019/069925.

*Primary Examiner* — Richard A Huhn
(74) *Attorney, Agent, or Firm* — Morgan, Lewis & Bockius LLP

(57) ABSTRACT

The invention relates to thermoplastic molding compounds having melt viscosities of less than 30,000 mPas for use as a hot-melt adhesive, comprising the components A and B, wherein component A comprises one or more $C_3/C_2$ copolymers each produced with metallocene catalysts and each having a melt viscosity at 170° C. of less than 20,000 mPas, measured according to DIN 53019, and a molecular weight $M_W$ of 1000 g/mol to 50,000 g/mol, and component B comprises one or more $C_2/C_3$ copolymers each produced with metallocene catalysts and each having a melt flow index MI of 1 to 100 g/m in, measured at 190° C./2.16 kg, (Continued)

according to ASTM D 1238, and a molecular weight $M_W$ of 50,000 g/mol to 300,000 g/mol. Said thermoplastic molding compounds, because of the viscosity and mechanical properties thereof, are suitable for fiber mesh applications.

22 Claims, 2 Drawing Sheets

(52) U.S. Cl.
CPC ... *C08L 2205/025* (2013.01); *C08L 2205/035* (2013.01); *C08L 2314/06* (2013.01)

(56) References Cited

U.S. PATENT DOCUMENTS

| | | | |
|---|---|---|---|
| 5,401,792 | A | 3/1995 | Babu et al. |
| 5,723,705 | A | 3/1998 | Herrmann et al. |
| 7,825,186 | B2 | 11/2010 | Bach et al. |
| 8,487,026 | B2 | 7/2013 | Bach et al. |
| 10,287,467 | B2 | 5/2019 | Herrlich et al. |
| 10,507,144 | B2 | 12/2019 | Stiehl et al. |
| 11,306,226 | B2 | 4/2022 | Hu et al. |
| 2006/0235134 | A1 | 10/2006 | Bach et al. |
| 2014/0371703 | A1 | 12/2014 | Davis et al. |
| 2017/0204306 | A1 | 7/2017 | Wang et al. |
| 2017/0290945 | A1 | 10/2017 | Hanson et al. |

FOREIGN PATENT DOCUMENTS

| | | | |
|---|---|---|---|
| EP | 0442045 | A2 | 8/1991 |
| EP | 0571882 | A2 | 12/1993 |
| EP | 0632063 | A1 | 4/1995 |
| EP | 1645608 | A1 | 4/2006 |
| EP | 1290100 | B1 | 7/2006 |
| EP | 1631641 | B1 | 3/2007 |
| EP | 2081609 | B1 | 3/2012 |
| EP | 2976403 | B1 | 8/2017 |
| EP | 3271436 | B1 | 8/2019 |
| JP | 2018-513242 | A | 5/2018 |
| WO | 2014/047317 | A1 | 3/2014 |
| WO | 2017/123874 | A1 | 7/2017 |
| WO | 2017/177164 | A1 | 10/2017 |

THERMOPLASTIC MOLDING COMPOUNDS

TECHNICAL FIELD

The invention relates to thermoplastic molding materials for use in or as a hot melt adhesive, comprising the components A and B, wherein the component A comprises one or more $C_3/C_2$-copolymers each of which have been produced with metallocene catalysts and each of which have a melt viscosity at 170° C. of less than 20 000 mPas measured according to DIN 53019 and a molecular weight $M_w$ of 1000 g/mol to 50 000 g/mol and the component B comprises one or more $C_2/C_3$-copolymers each of which have been produced with metallocene catalysts and each of which have a melt index MI of 1 to 100 g/10 min measured at 190° C./2.16 kg according to ASTM D 1238 and a molecular weight Mw of 50 000 g/mol to 300 000 g/mol.

The hot melt adhesive according to the invention is suitable for adhesive bonding of substrates with one another or for affixing powder or granulates to substrates of any kind, wherein the hot melt adhesives may contain in addition to the thermoplastic molding materials according to the invention tackifiers, plasticizers, organic or inorganic pigments, fillers, flame retardants, stabilizers, antistats, antioxidants and light stabilizers.

BACKGROUND

Hot melt adhesives are thermoplastic compositions solid at room temperature. When by heating they are converted into the liquid or molten state, i.e. the hot melt adhesive is open, the hot melt adhesive may be applied to a substrate. When a second substrate is applied to the hot melt adhesive before it has re-cooled to the solid state, an adhesive bond which bonds the two substrates may be formed. The hot melt adhesive has an open time optimized for the intended use and effects permanent adhesive bonding of the adherends. Hot melt adhesives typically contain a cohesive base polymer, an adhesive tackifier and optionally waxes, plasticizers (oils) and further additives. Typical hot melt adhesives and their function are described in U.S. Pat. No. 5,026,756.

Employed cohesive base polymers include polymers such as for example natural and synthetic rubbers, polyacrylates, polyisobutylenes, polyolefin(s), polyesters, polychloroprenes, polyvinyl ethers, polyurethanes, or styrene-butadiene (SBS), styrene isobutene (SIS), styrene-ethylene butadiene (SEBS) or styrene-ethylene-propylene (SEPS) block copolymers. These base polymers are generally responsible for the cohesive effect of the adhesive system.

The adhesive effect of hot melt adhesives is determined primarily by the tackifier which often is or contains a resin. These resins are for example low molecular weight products from the $C_5$- or $C_8$-stream of crude oil processing, often contain aromatics and usually have a glass transition temperature above room temperature.

Thus the admixing of resins into hot melt adhesive formulations increases the glass transition temperatures of the formulations and such hot melt adhesives therefore suffer from reduced low-temperature flexibility and the temperature range in which the hot melt adhesive may be used is limited.

Also employed as resins are polyterpene resins, natural and modified colophony resins, in particular resin esters, glycerol esters of wood resins, phenol-modified pentaerythritol esters and phenol-modified terpene resins. Such resin types contain substances which are irritant/a health concern such as abietic acid and may cause allergies, as a result of which they are questionable for applications in the hygiene sector, for foodstuffs packagings and in the medical sector.

Resins typically have a density of greater than 1 g/cm³ in some cases. The use of such resins in hot melt adhesive formulations therefore results in an increase in density, in particular in formulations comprising polyolefin as the cohesive base polymer. This means that at a constant application volume more hot melt adhesive by weight is required which is both a negative cost factor and results in a higher weight of the adhesively bonded substrates.

The plasticizer in the hot melt adhesive formulation brings about viscosity reduction of the adhesive composition and thus improves processability and ease of application. Hot melt adhesives generally contain mineral oils as plasticizers, in some cases in considerable amounts.

Mineral oils are crude oil-based and thus contain paraffinic, naphthenic, aromatic and polycyclic compounds as well as volatile organic compounds (VOC) which contribute to increased indoor air pollution. The compounds also present in mineral oils as MOSH and MOAH (mineral oil saturated hydrocarbons and respectively mineral oil aromatic hydrocarbons) are classed as toxicologically hazardous due to their propensity to accumulate in human tissue. Mineral oils are generally poorly integrated in hot melt adhesive formulations and thus have a propensity for increased migration.

Hot melt adhesives have a multiplicity of possible uses. They are employed in particular for adhesive bonds that are permanent. On account of the application from the melt hot melt adhesives can eschew solvents.

The processing of hot melt adhesives, in particular application to the relevant substrates, may be realized via diverse methods, for example by spraying, extrusion-application, application by means of a roller, a bead or a slot die. In order to be optimally suitable for the wide variety of application methods the hot melt adhesive must have rheological properties appropriate to the application method.

In hot melt adhesive technology spray-application is a commonly used application technique. In spin-spraying a melt thread exits a spray nozzle, is optionally extended by an air stream without tearing off and is then deposited on a substrate in a spiral pattern. The application temperatures are 150° C. to 250° C. depending on the material. Conventional hotmelt formulations based on styrene block copolymers but also polyolefins are difficult to spray at temperatures of 160° C. or less. Poor spray patterns result and severely limit the field of use. Higher application temperatures result in increased energy consumption and premature aging of the adhesive resulting in mechanical detriments.

EP 0 442 045 A2 provides exceptionally sprayable hot melt adhesive compositions which afford a uniform spray pattern. They are based substantially on amorphous poly-alpha-olefins which are not produced with metallocenes and have the following features: a softening point between 70° C. and 130° C., a melt viscosity (at 190° C.) between 1000 mPas and 20 000 mPas, a needle penetration between eight and 40 [0.1 mm] and a polydispersity of not more than six. The compositions according to the invention may be applied equally advantageously both by atomization and by spin-spraying.

EP 1 631 641 describes hot melt adhesives containing polyolefin waxes, wherein the polyolefin waxes are produced using metallocene catalysts and have a ring/ball drip or softening point between 80° C. and 165° C. and a maximum melt viscosity of 40 000 mPas measured at a temperature of 10° C. above the drip or softening point.

EP 1 645 608 discloses a hot melt composition comprising polyolefin waxes produced using metallocene catalysts having a ring/ball drip or softening point between 80° C.-165° C., having a melt viscosity measured at 170° C. between 20 mPas-40 000 mPas and having a glass transition temperature of not more than −10° C.

U.S. Pat. No. 5,401,792 describes sprayable hot melt adhesive compositions comprising (A) styrene block copolymers, (B) tackifying resin and (C) ethylene copolymer. Methods for the production and the use of said compositions are likewise disclosed.

EP 2 081 609 relates to a hot melt adhesive for adhesive bonding of fiber materials such as matted fibrous webs or woven textiles with smooth substrate surfaces, such as plastics or metal films/foils, and for laminating these materials. This substance has the feature that it contains at least one polyolefin which has been produced by polymerization in the presence of a metallocene as catalyst and has a ring/ball softening point between 50° C. and 165° C. and a melt viscosity measured at a temperature of 170° C. between 20 mPas and 40 000 mPas. The hot melt adhesive may contain at least one adhesive component and is used in an amount between 3 g/m$^2$ and 6 g/m$^2$, preferably between 4 g/m$^2$ and 5.5 g/m$^2$, for adhesive bonding of a film to a fibrous web in the production of hygiene articles such as disposable diapers, baby diapers, incontinence products, pantyliners and/or sanitary towels.

EP 1 290 100 relates to a process for atomizing, spiral spraying, oscillation spraying or melt blowing of propylene copolymers onto a substrate, comprising selecting a poly-alpha-olefin interpolymer comprising: A) 60 to 94 mol % of units derived from an alpha-monoolefin having 3 to 6 carbon atoms and B) 6 to 40 mol % of units derived from ethylene or one or more other monoolefins having 4 to 10 carbon atoms and at least one carbon atom more than A); and C) optionally 0 to 10 mol % of units derived from another copolymerizable unsaturated hydrocarbon distinct from A) and B); i) and an Mw/Mn of 6 or less; ii) a storage modulus G' which when determined during cooling intersects a value of 0.3 MPa measured at a temperature of less than 85° C.; iii) a G"/G' ratio of 18 or more when G' is 10 Pa at a frequency of 1 Hz; and iv) a viscosity of 5000 mPas or less at 190° C., and atomizing, spiral spraying, oscillation spraying or melt blowing the inter-polymer into a substrate. Mixtures of the abovementioned copolymers may also be employed here.

EP 2 976 403 relates to a ready to use hot melt adhesive compositions containing at least 95% by weight of one or more polyolefin copolymer waxes which have been produced using metallocene catalysts, wherein the polyolefin copolymer wax is composed of propylene and one or more further monomers selected from ethylene and branched or unbranched 1-alkenes having 4 to 20 carbon atoms and the content of structural units derived from propylene in the copolymer waxes is 80% to 99.9% by weight and the hot melt adhesive composition has a surface tension of the melt measured at a temperature of 170° C. of not more than 23 mN/m.

EP 3 271 436 discloses an olefin-based sprayable hot melt adhesive and absorbent articles containing the adhesive. The olefin-based sprayable hot melt adhesive is particularly suitable for spraying at low application temperatures. The sprayable hot melt adhesives having a low application temperature feature high initial strength, exceptional adhesion and aging resistance. The sprayable hot melt adhesives having a low application temperature further allow thin adhesive bonds without bleedthrough or burnthrough risks for heat-sensitive substrates.

WO 2014/047317 describes a hot melt adhesive and articles produced using the hot melt adhesive to bond structures in an article. The hot melt adhesive composition is typically produced by mixing an amorphous polymer with a heterophasic polymer having a substantial crystalline proportion.

The hot melt adhesives described in the prior art may be applied to the substrate either by extrusion, application by means of a roller, bead or slot die or by spray application. Different viscosity ranges are employed depending on the application technique. Sprayable hot melt adhesive compositions are primarily in the low viscosity range. The low viscosity of a sprayable hot melt adhesive is normally associated with insufficient mechanical properties which negatively affect the cohesive properties of the material. These include in particular properties such as the breaking elongation or strength of the material. Substrates of this kind adhesively bonded by spray applications usually withstand only low mechanical stresses. They are optimized to ensure the most homogeneous and thus material-efficient coating of the substrate to be adhesively bonded. The adhesive bonding of the substrates is the priority here while, by contrast, the cohesive polymer is intended to ensure sufficient stability to prevent the adhesive bond per se from becoming brittle. The elasticity of the adhesive bond plays only a secondary role here. While hot melt adhesives having a higher viscosity can be made sprayable by increasing the application temperature such a temperature increase results in elevated energy consumption and can lead to undesired thermally induced degradation of the employed components.

SUMMARY OF THE DISCLOSURE

The invention has for its object to provide improved hot melt adhesives that may be applied by energy-efficient and material-efficient application techniques while nevertheless ensuring a high mechanical stability of the adhesive bond and thus opening up possible uses that place elevated demands on the stability of the adhesive bond. These include in particular fiber web spraying applications which can affix granulates or powders without impairing mass transfer with the environment. Since many hot melt adhesives are often used in direct contact with the human body or are used in everyday articles it is advantageous when the hot melt adhesive contains neither resins nor mineral oils so that it exhibits improved environmental soundness and lower toxicology and is producible in a sustainable manner.

This object is achieved by thermoplastic molding materials having a melt viscosity of less than 30 000 mPas, comprising the components A and B, wherein the component A comprises one or more $C_3/C_2$-copolymers each of which have been produced with metallocene catalysts and each of which have a melt viscosity at 170° C. of less than 20 000 mPas measured according to DIN 53019 and a molecular weight $M_w$ of 1000 g/mol to 50 000 g/mol and the component B comprises one or more $C_2/C_3$-copolymers each of which have been produced with metallocene catalysts and each of which have a melt index MI of 1 to 100 g/10 min measured at 190° C./2.16 kg according to ASTM D 1238 and a molecular weight $M_w$ of 50 000 g/mol to 300 000 g/mol.

The melt viscosity depends not only on molecular structure but also on temperature and shear conditions. Accordingly the melt viscosity is measured for respectively different temperatures as a function of shear rate in a rotational viscometer according to DIN 53019. At high viscosities viscosity determination by rotational viscometer is not customary and accordingly for high-viscosity polymers the melt index MI is reported. Said index is determined according to ASTM D 1238.

In an alternative embodiment, the thermoplastic molding material is composed of components A and B.

DETAILED DESCRIPTION OF THE DISCLOSURE

Figure 1:
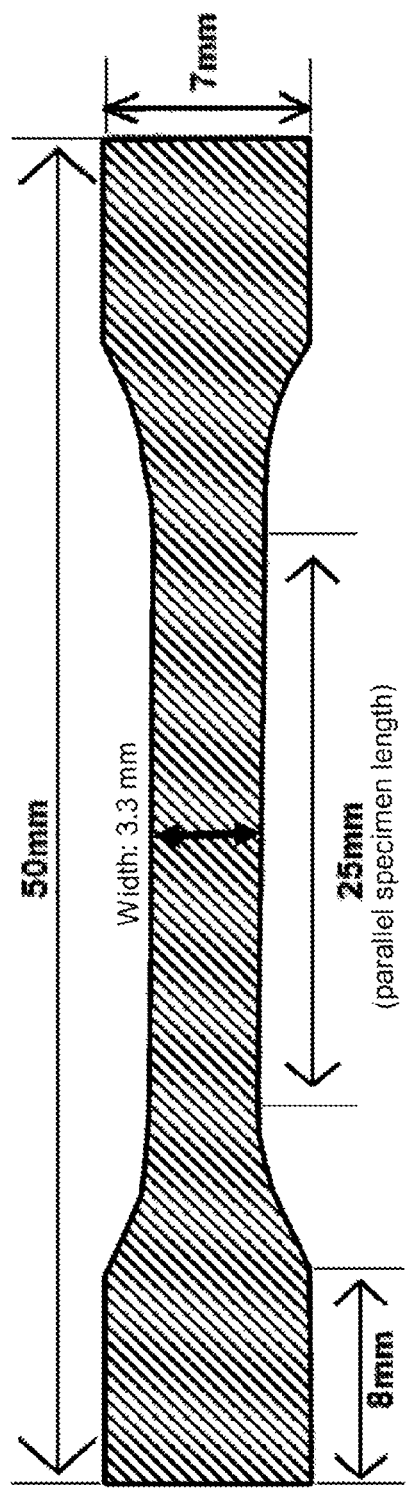
FIG. 1: Schematic representation of the test specimen used in determining breaking elongation

The invention relates to thermoplastic molding materials for use in or as a hot melt adhesive, comprising the components A and B.

The component A is preferably composed of one or more $C_3/C_2$-copolymers each of which have been produced with metallocene catalysts and each of which have a melt viscosity at 170° C. of less than 20 000 mPas measured according to DIN 53019 and a molecular weight Mw of 1000 g/mol to 50 000 g/mol.

The component B is preferably composed of one or more $C_2/C_3$-copolymers each of which have been produced with metallocene catalysts and each of which have a melt index MI of 1 to 100 g/10 min measured at 190° C./2.16 kg according to ASTM D 1238 and a molecular weight Mw von 50 000 g/mol to 300 000 g/mol.

Production of the copolymers of propylene used for the thermoplastic molding material according to the invention may employ metallocene catalysts composed of chiral or achiral transition metal compounds of formula $M^1L_x$. The transition metal compound $M^1L_x$ contains at least one metal central atom $M^1$, to which at least one π-ligand L, for example a cyclopentadienyl ligand, is bonded. Substituents, for example halogen, alkyl, alkoxy or aryl groups, may also be bonded to the metal central atom $M^1$. $M^1$ is preferably an element of main group III, IV, V or VI of the periodic table of the elements, such as Ti, Zr or Hf. Cyclopentadienyl ligands are to be understood as meaning unsubstituted cyclopentadienyl radicals and substituted cyclopentadienyl radicals such as methylcyclopentadienyl, indenyl, 2-methylindenyl, 2-methyl-4-phenylindenyl, tetrahydroindenyl or octahydrofluorenyl radicals. The π-ligands may be bridged or unbridged and single and multiple bridges—including via ring systems—are possible. To activate the single-center catalyst systems suitable cocatalysts are employed, for example organoaluminum compounds, in particular aluminoxanes or else aluminum-free systems. Examples of metallocene catalysts, their activation and handling for polymerization are described for example in EP 0384264 and EP 0571882. The term metallocene also comprises compounds having more than one metallocene fragment, so-called polynuclear metallocenes. These may have any desired substitution pattern and bridging variants. The individual metallocene fragments of such polynuclear metallocenes may be either identical or different from one another. Examples of such polynuclear metallocenes are described in EP 0632063 for example.

Depending on the process supported single-center catalysts may also be employed. Catalyst systems where the residual contents of support material and cocatalyst do not exceed a concentration of 100 ppm in the product are preferred.

In a preferred embodiment the melt viscosity of the inventive thermoplastic molding materials measured according to DIN 53019 is between 100-25 000 mPas, preferably between 500-20 000 mPas, particularly preferably between 1000-15 000 mPas, measured according to DIN 53019. In these viscosity ranges an optimal spraying result is achievable with the standard spraying methods.

In a further preferred embodiment the thermoplastic molding material has a strength of not less than 8 MPa measured according to ISO 527 save for the dumbbell-shaped test specimen used (cf. FIG. 1) which has the following dimensions which deviate from the specification according to ISO 527: total length: 50 mm, width of narrow part: 3.3 mm, width at ends: 7 mm, length of narrow parallel part: 25 mm, thickness: 1 mm.

The tensile strength at break is determined according to ISO 527 by a tensile elongation test. This determines the force per unit area (reported in MPa) required to break the test specimen.

In a further preferred embodiment the thermoplastic molding material has a breaking elongation of more than 1000% measured according to ISO 527 save for the test specimen used which has the following dimensions which deviate from the specification according to ISO 527: total length: 50 mm, width of narrow part: 3.3 mm, width at ends: 7 mm, length of narrow parallel part: 25 mm, thickness: 1 mm Breaking elongation is a measure of the deformation behavior of a polymer and is determined according to ISO 527 by a tensile elongation test in the same test run as for determination of strength. The value for breaking elongation indicates the percentage elongation of the test specimen until failure of the material.

The component A is present in the thermoplastic molding material preferably in weight fractions of 2% by weight to 98% by weight based on the total weight of the thermoplastic molding material, more preferably of 30% by weight to 95% by weight, particularly preferably of 40% by weight to 90% by weight.

The component B is present in the thermoplastic molding material preferably in weight fractions of 2% by weight to 98% by weight based on the total weight of the thermoplastic molding material, more preferably of 5% by weight to 70% by weight, particularly preferably of 10% by weight to 60% by weight. At these weight ratios the properties of the individual components of the corresponding molding materials are combined in optimal fashion.

In a preferred embodiment the influence of component B is improved in that component B is an elastomeric, semicrystalline $C_3/C_2$-copolymer having a proportion of propylene greater than 80% by weight determined by $^{13}$C-NMR, as a result of which the component B provides a ratio of crystalline to amorphous proportions in the polymer that is well-balanced for the use. In the context of the invention "semicrystalline" is to be understood as meaning that the properties of the copolymer are determined both by the crystalline regions and by the amorphous regions of the copolymer. The thermal and mechanical properties of the copolymer may be influenced via the degree of crystallinity.

In a particularly preferred embodiment the thermoplastic molding material has the feature that the component B has a melting enthalpy measured according to ISO 11357-2 of 0 to 50 J/g, preferably of 1 to 30 J/g, particularly preferably of 2 to 20 J/g. The crystallinity of a copolymer may be quantitatively expressed in percent. Such a percentage normally relates to a reference crystallinity. In this case the reference is 100% crystalline, isotactic polypropylene homopolymer (heat of melting of the 100% crystalline, isotactic polypropylene homopolymer: $\Delta h_{100\%}$=207 J/g). The degree of crystallinity may be determined via the heat of melting of the second heating curve $\Delta H_{2nd\ heating}$ once after a first heating to 180° C. the material has been cooled at 10 K/min to −50° C. and subsequently heated a second time at 10 K/min:

Degree of crystallinity $$\text{Degree of crystallinity } \alpha[\%] = \frac{\Delta H_{2nd\ heating}\left[\frac{J}{g}\right]}{\Delta H_{100\%}\left[\frac{J}{g}\right]} * 100\%$$

Thus the theoretical heat of melting of a perfectly crystalline isotactic polypropylene is 207 J/g. Thus for the crystallinity of a semicrystalline random copolymer having a heat of melting of 95 J/g, a crystallinity of 46% results.

In a further preferred embodiment the component A is preferably a random copolymer of propylene having a propylene proportion of 70% by weight to 95% by weight based on the molecular weight Mw of the copolymer and an ethylene proportion of 5% by weight to 30% by weight which, through the random distribution of the monomers, makes the amorphous character of the polymer adjustable in accordance with the intended use.

In a particularly preferred embodiment the component A has a weight-average molecular weight of 1000 to 50 000 g/mol, preferably 5000 to 30,000 g/mol, and the component B has a weight-average molecular weight according to ISO 16014 of 50 000 to 300 000 g/mol, preferably 70 000 to 150 000 g/mol. In order to achieve an optimum viscosity for processing of the thermoplastic molding materials the component A in a preferred embodiment has a melt viscosity at 170° C. measured according to DIN 53019 of less than 20 000 mPas, preferably 10 to 10 000 mPas, particularly preferably 100 to 5000 mPas, and component B has a melt viscosity at 170° C. measured according to DIN 53019 of more than 20 Pas, preferably 50 to 10 000 Pas, particularly preferably 100 to 5000 Pas. In a further preferred embodiment the component A has a melt viscosity at 170° C. measured according to DIN 53019 of less than 20 000 mPas, preferably 10 to 10 000 mPas, particularly preferably 100 to 5000 mPas, and component B can have a melt index at 190° C./2.16 kg measured according to ASTM D1238 of between 1 g/10 min and 50 g/10 min, preferably between 1 g/10 min and 30 g/10 min. Optimum spraying results are achievable in these viscosity ranges.

In a preferred embodiment the component A has a melting point $T_m$ determined via the DSC peak temperature according to DIN EN ISO 11357-1 between 50° C. and 120° C., preferably between 60° C. and 110° C. and particularly preferably between 70° C. and 100° C.

In a further preferred embodiment the component A has a glass transition temperature TG determined by DSC according to DIN EN ISO 11357-2 of less than −10° C., preferably less than −15° C. and particularly preferably less than −20° C.

In a further preferred embodiment the component A has a zero-shear viscosity (zsv) determined according to DIN 53019-4 between 0.01 mPas and 10 000 mPas, preferably between 0.1 mPas and 1000 mPas and particularly preferably between 1 mPas and 850 mPas.

In a further preferred embodiment the component A has a density determined according to ISO 1183 of less than 0.95 g/cm³, preferably less than 0.92 g/cm³ and particularly preferably less than 0.90 g/cm³.

In a further preferred embodiment the component A has a polydispersity index of less than 5, preferably less than 3, particularly preferably less than 2.5. The polydispersity index PDI is calculated from the quotient of weight-average molecular weight $M_w$ and number-average molecular weight $M_n$ and was determined according to the standard ISO 16014.

The copolymers of propylene used as component A for the thermoplastic molding materials according to the invention can both assume the function of the base polymer and replace the functions of the plasticizer and the tackifier in the formulation. This results in further advantages for the user. For example fewer components need to be melted and mixed, thus resulting in faster and more cost-effective working processes. It is also possible to produce purely polyolefin-based hot melt adhesive compositions.

The use of copolymers of propylene from component A in the thermoplastic molding material according to the invention as tackifiers, instead of resins and plasticizers, ensures a better integration thereof into the polyolefin matrix, thus resulting in reduced migration (no "bleedthrough") and reduced formation of VOCs.

The thermoplastic molding material achieves particularly advantageous mechanical properties in a preferred embodiment when the component A has a breaking elongation measured according to ISO 527 of less than 1000% and component B has a breaking elongation measured according to ISO 527 of greater than 1000%.

The invention further relates to a hot melt adhesive which is composed of the thermoplastic molding material according to the invention or contains said material in addition to further components.

The thermoplastic molding material according to the invention may additionally contain tackifiers, in particular resins, or plasticizers.

In a particularly preferred embodiment the hot melt adhesive is produced without addition of tackifiers or plasticizers and this embodiment is therefore particularly environmentally sound and toxicologically unconcerning and is therefore suitable for use on the human body.

In the context of the invention resin- and mineral oil-free is to be understood as meaning that the resin/mineral oil fraction is in each case below 1% by weight based on the pressure sensitive adhesive composition according to the invention.

The hot melt adhesive according to the invention may contain in addition to the thermoplastic molding material according to the invention organic or inorganic pigments, fillers, flame retardants, stabilizers, antistats, antioxidants and light stabilizers.

The invention further relates to a process for producing the thermoplastic molding material according to the invention by mixing the components A and B, wherein the component A comprises one or more $C_3/C_2$-copolymers each of which have been produced with metallocene catalysts and each of which have a melt viscosity at 170° C. of less than 20 000 mPas measured according to DIN 53019 and a molecular weight Mw of 1000 g/mol to 50 000 g/mol and the component B comprises one or more $C_2/C_3$-copolymers each of which have been produced with metallocene catalysts and each of which have a melt index MI of 1 to 100 g/10 min measured at 190° C./2.16 kg according to ASTM D 1238 and a molecular weight $M_w$ of 50 000 g/mol to 300 000 g/mol.

The process according to the invention comprises the mixing of the components A and B, in particular using a co-rotating twin-screw extruder at a processing temperature between 150° C. and 200° C.

The invention further relates to the use of the thermoplastic molding material according to the invention/of the hot melt adhesive according to the invention for bonding flexible and/or rigid substrates of any kind.

The hot melt adhesive/thermoplastic molding materials according to the invention are suitable for bonding flexible and/or rigid substrates of any kind, for example paper, cardboard packagings, glass, wood, PP, PE, ABS, in particular for structured substrates or textile substrates such as for example fibrous webs, woven or non-woven textiles. Those skilled in the art understand structured substrates to mean substrates having a profile depth Pt of greater than 1 mm.

The hot melt adhesive according to the invention/the thermoplastic molding material according to the invention is particularly preferably used for bonding and of fixing coarse-grain bulk solids, for example granulates. For these applications the improved hot melt adhesives may be applied such that rather than forming a compact, homogeneous film they form a web-like air- and moisture-permeable structure. These web-like air- and moisture-permeable structures are suitable in particular for affixing for example absorbers onto substrates of any kind. Through this type of affixing it is possible in particular to affix fillers, drying agents or moisture absorbers in hygiene articles, packaging materials, vehicle bodies, furniture, soft furnishings or mattresses for example and to surfaces of any type where the affixed absorbent must withstand a certain mechanical stress.

Very surprisingly, thermoplastic molding materials having the described features combine good processability of the molding material, brought about by the low viscosity thereof, with exceptional mechanical properties which can otherwise only be realized by molding materials having higher viscosities. These combinations of the properties described qualify the molding materials according to the invention for use as high-performance hot melt adhesives.

Methods of Measurement:

The recited polyolefins were characterized according to the recited standards. Non-standard characterizations were carried out as per the description.

Determination of the weight-average molecular weights $M_w$ of the copolymers was performed in 1,3-ortho-dichlorobenzene with a PP calibration. Measurement was carried out by gel permeation chromatography at a temperature of 135° C. Determination was carried out according to ISO 16014-1.

Determination of the melt viscosity was carried out according to the standard DIN 53019.

The polydispersity index PDI is calculated from the quotient of weight-average molecular weight Mw and number-average molecular weight Mn and was determined according to the standard ISO 16014-1.

The mechanical properties (strength, breaking elongation) of the polyolefins and of the hot melt adhesive compositions were determined according to ISO 527 save that in each case a non-standard test specimen produced by hot melt pressing and differing from the test specimen conforming to the standard in terms of its dimensions was used. The test specimens used to measure strength and breaking elongation have the following dimensions: total length: 50 mm, width of narrow part: 3.3 mm, width at ends: 7 mm, length of narrow parallel part: 25 mm, thickness: 1 mm.

Breaking elongation corresponds to tensile strength at break and is determined according to ISO 527 by a tensile elongation test. This determines the force per unit area (reported in MPa) required to break the test specimen. With the exception of the test specimen the tensile test was carried out according to the standard ISO 527.

FIG. 1: Schematic representation of the test specimen used in determining breaking elongation FIG. 2: Schematic representation of the static peel test.

Examples

To produce the molding materials according to the invention polymers 1 and 2 were used as component A and polymers 3 and 4 were used as a component B. The components A and B are each characterized in more detail in tables 1 and 2.

TABLE 1

| Component A | | |
|---|---|---|
|  | Polyolefin A1 | Polyolefin A2 |
| Melt viscosity @ 170° C. [mPas] (DIN 53019) | 200 | 2200 |
| Weight-average molecular weight $M_w$ [g/mol] (ISO 16014) | 8700 | 17 800 |
| PDI (ISO 16014) | 1.5 | 2.1 |
| Glass transition temperature $T_G$ [° C.] (DIN EN ISO 11357-2:2016) | −30 | −25 |
| Density (ISO 1183) [g/cm$^3$] | 0.87 | 0.884 |
| Melting point $T_m$ [° C.] (DIN EN ISO 11357-1:2016) | 77 | 95 |
| Heat of melting $\Delta H_m$ [J/g] (DIN EN ISO 11357-1:2016) | 36 | 37 |
| Breaking elongation [%] (ISO 527) | 10 | 600 |
| Strength [MPa] (ISO 527) | 2 | 9.0 |

The components from table 1 are commercial copolymers obtainable under the trade names Licocene® 1302 and Licocene® 2502.

TABLE 2

| Component B | | |
|---|---|---|
|  | Polyolefin B1 | Polyolefin B2 |
| MI [g/10 min] (190° C./2.15 kg, ASTM D1238) | 21 | 8 |

TABLE 2-continued

| | Component B | |
| --- | --- | --- |
| | Polyolefin B1 | Polyolefin B2 |
| Weight-average molecular weight $M_w$ [g/mol] (ISO 16014) | 80 300 | 128 400 |
| PDI (ISO 16014) | 2.5 | 2.5 |
| Melting point $T_m$ [° C.] (DIN EN ISO 11357-1:2016) | 95 | 60 |
| Heat of melting $\Delta H_m$ [J/g] (DIN EN ISO 11357-1:2016) | 12 | 17.7 |
| Breaking elongation [%] (ISO 527) | 1356 | 1100 |
| Strength [MPa] (ISO 527) | 17.7 | 29.5 |

The components from table 2 are commercial copolymers obtainable under the trade names Vistamaxx®3000 and Vistamaxx®6502.

The polyolefins described in tables 1 and 2 were produced by melt extrusion as melt mixtures of the components. This was achieved using a co-rotating twin-screw extruder at a speed of 130 rpm and a processing temperature of 180° C. The extrusion throughput was 7 kg/h.

The comparative examples show prior art mixtures which employ in addition to a poly-alpha-olefin a SEBS block copolymer Kraton® MD 1648 or else a resin as a further component.

The following properties were determined from the hot melt adhesive compositions thus produced:

melt viscosity at 170° C.,
tensile strength in MPa,
breaking elongation in [%].

Thermoplastic molding materials/hot melt adhesives were also tested for their suitability for the intended use: To this end two flexible substrates having dimensions of 5 cm×30 cm were coated by spray application with the hot melt adhesive composition and bonded to one another. An application weight between 3 to 5 g/m² was sought. To the extent that the tested thermoplastic molding materials/hot melt adhesives were sprayable the static peel test described hereinbelow was performed:

The bonded article formed (test specimen) was tested to determine delamination resistance by subjecting a test specimen to a static peel test at room temperature.

Figure 2:
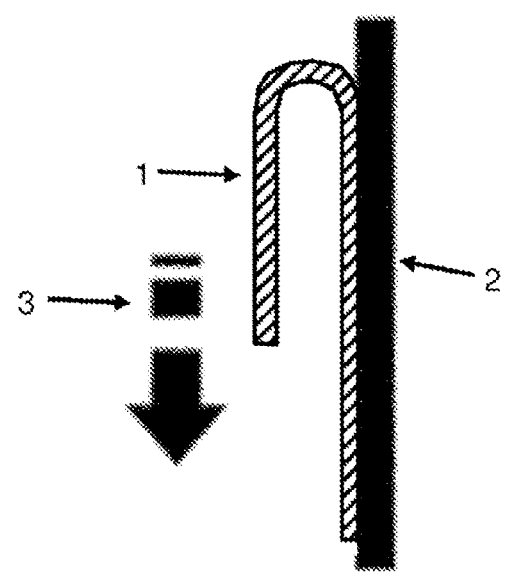
FIG. 2: Schematic representation of the static peel test.

This comprises delaminating the test specimen on a narrow side to form two flaps to which the substrates may be secured (see FIG. 2). One of these so-called tabs is secured to a holder while a weight of 100 g is secured to the other tab.

Measurement commences with release of the weight in the pulling direction (3) to delaminate an adherend (1) at a peel angle of 180° from the other substrate (2). The elapsed time from release of the weight until complete delamination is then recorded. The test is repeated 5 times and the average time is the parameter recorded. The longer the elapsed time the better the delamination resistance. In the case of a non-woven as the substrate an average elapsed time of more than 250 seconds may be regarded as a good result. This is a comparative test, the result of which can vary greatly depending on the nature of the substrates.

TABLE 3

Working examples (inventive)/(employed amounts in % by weight)

| | Ex. 1 | Ex. 2 | Ex. 3 | Ex. 4 | Ex. 5 | Ex. 6 | Ex. 7 |
| --- | --- | --- | --- | --- | --- | --- | --- |
| Polyolefin A1 | | | 50 | 23 | 20 | | |
| Polyolefin A2 | 50 | 70 | | 58 | 50 | 85 | 95 |
| Polyolefin B1 | 50 | 30 | 50 | 19 | | | 5 |
| Polyolefin (IIb) B2 | | | | | 30 | 15 | |
| Melt viscosity @ 170° C. [mPa · s] | 23638 | 12535 | 10425 | 6314 | 7470 | 9230 | 3025 |
| Tensile strength [N/mm²] | 12.3 | 11.0 | 8.8 | 9.3 | 8.3 | 11.2 | 9.8 |
| Breaking elongation [%] | 1470 | 1250 | 1497 | 1290 | 1210 | 1298 | 1091 |
| static peel hang-time test (sec) | >300 | >300 | >300 | >300 | >300 | >300 | >300 |

TABLE 4

Comparative examples (noninventive)/(employed amounts in % weight)

| | C1 | C2 | C3 | C4 | C5 |
| --- | --- | --- | --- | --- | --- |
| Polyolefin A1 | | 60 | | 8 | |
| Polyolefin A2 | 50 | | 60 | 32 | |
| Polyolefin B2 | | | | 20 | |
| Kraton MD 1648 | 50 | 40 | 40 | 40 | 100 |
| Viscosity @170° C. [mPa · s] | 70 000 | 12 000 | 13 250 | 32 900 | 400 000 |
| Strength [N/mm²] | 6.05 | 1.7 | 6.6 | 3.2 | 8.1 |
| Breaking elongation [%] | 815 | 344 | 850 | 426 | 673 |
| static peel hang-time test (sec) | Not usable since not sprayable | 40 sec | 90 sec | Not usable since not sprayable | Not usable since not sprayable |

Kraton® MD 1648 from table 4 is a styrene block copolymer (SEBS) from Kraton.

The inventive examples show markedly better values compared to the comparative examples in the static peel test to the extent that the hot melt adhesive formulation was sprayable. While having good mechanical properties, comparative formulations that are not sprayable were not able to achieve the object of the invention of better processability. Only the inventive examples simultaneously exhibit sufficient viscosity, strength and breaking elongation to be suitable for realizing fiber web spraying applications. The comparative formulations fail in terms of at least one of the properties mentioned (viscosity, strength, breaking strength) and are thus unsuitable for use for fiber web applications.

The invention claimed is:

1. A thermoplastic molding material comprising the components A and B, wherein the thermoplastic molding material has a melt viscosity at 170° C. of less than 30 000 mPas, measured according to DIN 53019, wherein
   the component A comprises one or more $C_3/C_2$-copolymers each of which have been produced with metallocene catalysts and have a melt viscosity at 170° C. of less than 20 000 mPas measured according to DIN 53019 and a weight-average molecular weight according to ISO 16014 of 1000 g/mol to 50 000 g/mol, and
   the component B comprises one or more $C_2/C_3$-copolymers each of which have been produced with metallocene catalysts and have a melt index MI of 1 to 100 g/10 min measured at 190° C./2.16 kg according to ASTM D 1238 and weight-average molecular weight according to ISO 16014 of 50 000 g/mol to 300 000 g/mol.

2. The thermoplastic molding material as claimed in claim 1, wherein the thermoplastic molding material has a melt viscosity at 170° C. of 100 to 25 000 mPas, measured according to DIN 53019.

3. The thermoplastic molding material as claimed in claim 1, wherein the thermoplastic molding material has a melt viscosity at 170° C. of 500 to 20 000 mPas, measured according to DIN 53019.

4. The thermoplastic molding material as claimed in claim 1, wherein the thermoplastic molding material has a melt viscosity at 170° C. of 1000 to 15 000 mPas, measured according to DIN 53019.

5. The thermoplastic molding material as claimed in claim 1, wherein the thermoplastic molding material has a strength of not less than 8 MPa measured according to ISO 527 save that the test specimens used have the following dimensions: total length: 50 mm, width of narrow part: 3.3 mm, width at ends: 7 mm, length of narrow parallel part: 25 mm, thickness: 1 mm.

6. The thermoplastic molding material as claimed in claim 1, wherein the thermoplastic molding material has a breaking elongation of more than 1000% measured according to ISO 527 save for the test specimen used which has the following dimensions: total length: 50 mm, width of narrow part: 3.3 mm, width at ends: 7 mm, length of narrow parallel part: 25 mm, thickness: 1 mm.

7. The thermoplastic molding material as claimed in claim 1, wherein said material contains 2% by weight to 98% by weight, based on the total weight of the thermoplastic molding material, of the component A and 2% by weight to 98% by weight, based on the total weight of the thermoplastic molding material, of the component B.

8. The thermoplastic molding material as claimed in claim 1, wherein said material contains 30% by weight to 95% by weight, based on the total weight of the thermoplastic molding material, of the component A and 5% by weight to 70% by weight, based on the total weight of the thermoplastic molding material, of the component B.

9. The thermoplastic molding material as claimed in claim 1, wherein component B is an elastomeric, semicrystalline $C_3/C_2$-copolymer having a proportion of propylene greater than 80% by weight.

10. The thermoplastic molding material as claimed in claim 1, wherein component A is a random copolymer of propylene derived from 70% to 95% by weight of propylene and from 5% to 30% by weight of ethylene.

11. The thermoplastic molding material as claimed in claim 1, wherein the component B has a melting enthalpy measured according to ISO 11357-2 of 0 to 50 J/g.

12. The thermoplastic molding material as claimed in claim 1, wherein the component A has a weight-average molecular weight according to ISO 16014 of 5000 to 30 000 g/mol, and component B has a weight-average molecular weight according to ISO 16014 of 70 000 to 150 000 g/mol.

13. The thermoplastic molding material as claimed in claim 1, wherein the component A has a melt viscosity at 170° C. measured according to DIN 53019 of 10 to 10 000 mPas, and component B has a melt index at 190° C./2.16 kg measured according to ASTM D1238 of between 1 g/10 min and 50 g/10 min.

14. The thermoplastic molding material as claimed in claim 1, wherein the component B has a melt index at 190° C./2.16 kg measured according to ASTM D1238 of between 1 g/10 min and 30 g/10 min.

15. The thermoplastic molding material as claimed in claim 1, wherein the component A has a melt viscosity at 170° C. measured according to DIN 53019 of 10 to 10 000 mPas, and component B has a melt index at 190° C./2.16 kg measured according to ASTM D1238 of between 1 g/10 min and 30 g/10 min.

16. The thermoplastic molding material as claimed in claim 1, wherein component A has a breaking elongation less than 1000% measured according to ISO 527 save for the test specimen used and component B has a breaking elongation greater than 1000% measured according to ISO 527 save for the test specimen used which has the following dimensions: total length: 50 mm, width of narrow part: 3.3 mm, width at ends: 7 mm, length of narrow parallel part: 25 mm, thickness: 1 mm.

17. A process for producing a thermoplastic molding material as claimed in claim 1 by mixing the components A and B.

18. A process, the process comprising bonding or affixing substrates with the thermoplastic molding material of claim 1.

19. A hot melt adhesive containing a thermoplastic molding material as claimed in claim 1.

20. The hot melt adhesive as claimed in claim 19, wherein said adhesive contains no tackifiers or plasticizers.

21. The hot melt adhesive as claimed in claim 19, wherein said adhesive contains organic or inorganic pigments, fillers, flame retardants, stabilizers, antistats, antioxidants and light stabilizers.

22. A process, the process comprising bonding or affixing substrates with the hot melt adhesive of claim 19.

* * * * *